United States Patent
Pappas et al.

(10) Patent No.: US 8,121,912 B2
(45) Date of Patent: Feb. 21, 2012

(54) AUTOMATED METHOD FOR RECONCILING ASYNCHRONOUS TIME ATTENDANCE RECORDS

(75) Inventors: Anthony Henryk Pappas, Woodland Hills, CA (US); Eric R. Renken, Niles, MI (US)

(73) Assignee: Exaktime Innovations, Inc., Calabasas, CA (US)

(*) Notice: Subject to any disclaimer, the term of this patent is extended or adjusted under 35 U.S.C. 154(b) by 610 days.

(21) Appl. No.: 11/697,368

(22) Filed: Apr. 6, 2007

(65) Prior Publication Data
US 2007/0250379 A1 Oct. 25, 2007

Related U.S. Application Data

(60) Provisional application No. 60/767,491, filed on Apr. 11, 2006.

(51) Int. Cl.
*G06F 15/02* (2006.01)
(52) U.S. Cl. .................. 705/32; 705/30; 705/31
(58) Field of Classification Search ............... 705/32
See application file for complete search history.

(56) References Cited

U.S. PATENT DOCUMENTS

| | | | |
|---|---|---|---|
| 4,812,627 A * | 3/1989 | Wexler et al. ............. | 705/32 |
| 4,819,162 A * | 4/1989 | Webb et al. .............. | 705/32 |
| 5,459,657 A * | 10/1995 | Wynn et al. ............. | 705/32 |
| 5,732,401 A * | 3/1998 | Conway ................. | 705/29 |
| 5,877,953 A * | 3/1999 | Clendenen et al. ....... | 700/17 |
| 6,304,851 B1 * | 10/2001 | Kmack et al. ........... | 705/11 |
| 6,751,650 B1 * | 6/2004 | Finch et al. ............ | 709/203 |
| 6,802,005 B1 * | 10/2004 | Berson ................. | 713/178 |
| 7,185,807 B1 * | 3/2007 | Robinson et al. ........ | 235/382 |
| 2004/0019542 A1 * | 1/2004 | Fuchs et al. ........... | 705/32 |
| 2005/0021428 A1 * | 1/2005 | Costello .............. | 705/32 |
| 2007/0112654 A1 * | 5/2007 | Garcia et al. .......... | 705/32 |

* cited by examiner

*Primary Examiner* — Ryan Zeender
*Assistant Examiner* — Fateh Obaid
(74) *Attorney, Agent, or Firm* — Kelly & Kelley, LLP

(57) ABSTRACT

A method for reconciling asynchronous time attendance records in a time attendance system is provided. The reconciliation method of the present invention can reconcile and synchronize time attendance records from a single time attendance recorder device, or multiple time attendance recorder devices which are independent from one another and not electronically connected to a central processor or each other. Each time attendance event includes a time attendance recorder identifying code, a user identifying code, and is processed according to whether it is determined to be a start activity or a stop activity. A series of completed time records is created for each user as all of the time attendance events from all of the recorder devices are processed.

41 Claims, 4 Drawing Sheets

AUTOMATED METHOD FOR RECONCILING ASYNCHRONOUS TIME ATTENDANCE RECORDS

BACKGROUND OF THE INVENTION

The present invention generally relates to the obtaining and reconciliation of time attendance records. More particularly, the present invention relates to an automated method of reconciling time attendance records which are asynchronous, such as being obtained from independent time clocks at multiple locations.

It is common practice for employees to "clock-in" and "clock-out" when checking in and checking out of work, such as when arriving at work, taking a lunch break and leaving for the day. The use of time clocks for tracking the time when an employee checks in and checks out is common place.

However, an employee or supervisor must collect the time cards at the end of the shift or work period (usually every week or two) and calculate the hours worked each day for each employee. This is a time consuming and expensive task. Moreover, in some work environments, such as a construction job site, it is difficult to monitor when employees check in and check out. This is due to the fact that such work sites are often outdoors and not conducive to the traditional time clock apparatuses. A company can lose thousands of dollars per year when employees arrive fifteen minutes late and leave fifteen minutes early, but do not reflect it on the written timesheets.

Aside from the potential work time lost or monetary fraud on the company, it takes a significant amount of time to calculate the hours worked each day for each employee. This is exasperated in certain industries, such as the construction industry, wherein workers may travel from one job site to another job site during the billing time period, or perhaps even during a given day.

There exists various automated clocks for tracking when an employee checks in and out. In many cases, when time attendance information is recorded on multiple clocks, the information is either shared with the clocks, or more typically, the information is sent to a central computer or processor in real time as the event happens, or occasionally in batches. In such scenarios, the time attendance records are synchronized with one another as the multiple time attendance devices are electronically connected with one another and/or the central processor. Thus, the central processor receives the time attendance records in a chronological fashion, even though the time attendance records or events may occur at different time attendance devices or clocks.

However, tracking and reconciling problems exist when time attendance records are asynchronous, such as when the time attendance records are brought in from multiple time attendance devices or clocks which are not connected to a central processor nor each other. The time attendance records are typically processed each time attendance device at a time, creating asynchronous and non-chronological records which are very difficult to reconcile.

Because the workflow patterns of a particular company may dictate that employees move between locations, and track their time at each of these locations, the fact that the information is brought in asynchronously may mean that erroneous information can result. Stated more simply, in an asynchronous system, it cannot be guaranteed at any one time the central server has any and all information from all clocks at that point in time. It may have limited information, or no information at all. This can cause a problem when the end user attempts to view the time information. Because the time stamps are not available from all the clocks, the information is inaccurate. Furthermore, when the information is eventually brought in from those clocks, it needs to properly synchronize with the time information that has already been brought in, so that the flow of temporal information is accurate.

Accordingly, there is a continuing need for a time attendance reconciliation method, wherein the reconciliation of an employee's time, particularly at multiple job sites, can be automated so as to save time and effort and obtain more accurate timesheets. The present invention fulfills these needs and provides other related advantages.

SUMMARY OF THE INVENTION

The present invention resides in an automated method for reconciling asynchronous time attendance records, such as time attendance records which are obtained from multiple time attendance devices which are not connected to one another nor connected to a central processor or the like. However, the automated reconciliation method of the present invention can also be used in association with time attendance records which are retrieved from a single time attendance device, but which are asynchronous and need to be reconciled.

The method of the present invention generally comprises the steps of assigning a unique identifying code for each of a plurality of users of a time attendance recorder. These users log in to the time attendance recorder using the user identifying code. For each log in, a time attendance event is created, which includes the time corresponding with the log in and the user identifying code. In a system wherein there are multiple time attendance recorders, each time attendance event typically also includes an identifying code for the time attendance recorder from which the time attendance event was obtained.

Periodically, the time attendance events are electronically transferred from the one or more attendance recorders to a central processor. Each time attendance event for each time attendance recorder is processed. This includes the steps of verifying the user identifying code by comparing the user identifying code with the database of known user identifying codes. If unable to verify, the system assigns a user identifying code to the time attendance event. Similarly, the time attendance recorder identifying code is verified by comparing it to a database of known time attendance recorder identifying codes. If unverified, an identifying code is assigned to the time attendance recorder for the particular time attendance event.

Processing a time attendance event also includes the step of retrieving a maximum time span allowed for the user associated with the time attendance event. The system determines whether the time attendance event is a start event time or a stop event time. For each user, chronological time records are created. Each time record has a start time and a stop time. For missing known start event times and stop event times, a time record is completed by automatically assigning a start time or a stop time corresponding with another known event time. For example, automatically assigning a start time or stop time may include the step of automatically assigning a start time or stop time corresponding to an immediately preceding or following known start event time or stop event time. The automatically assigned start or stop time is replaced when receiving an accurate, or known, start event time or stop event time.

More particularly, the processing step may include the steps of receiving a time attendance event and determining that it is a start event time. If the start event time comes between a completed record, determining if the completed time record has a known start event time from a time attendance recorder, or an automatically assigned start time. If it is determined that the start time is an automatically assigned start time, the assigned start time is overwritten with the received start event time. Alternatively, if it is determined that the time record start time is a known start event time, a new time record is created with the received start event time as the start time and assigning the time record a stop time corresponding to the stop time of the previous completed time record.

If the determined start event time does not come between a completed time record, it is determined that the previous time record has a stop time within the maximum time span allowed for the user associated with the time attendance event. If the previous time record has a stop time within the maximum time span, the time record is updated with an automatically assigned stop time that matches the received time attendance event time. It is then determined if the immediately following time is an assigned stop time. If so, the immediately following time record is updated with the received time attendance event time period. If it is determined that the immediately following time is not an assigned stop time, a new time record is created having the received time attendance event time as the start time with no stop time. It is then determined if there is a time record immediately following this new time record and if the time span between the start time and the next start time is within the maximum time span. If so, the new time record stop time is updated with the start time of the next time record. However, if not, the next time attendance event is retrieved and processed.

If it is determined that the previous time record has a stop time that is not within the maximum time span allowed for the user associated with the time attendance event, there are several options. First, it is determined if the immediately following time is an assigned stop time. If so, the immediately following time record start time is updated with the received time attendance event time. However, if the immediately following time is not an assigned stop time, a new time record having the received time attendance event time is created as the start time with no stop time. It is then determined if there is a time record immediately following this new time record, and if the time span between this start time and the next start time is within the maximum time span. If so, the new time record stop time is updated with the new start time of the next time record. However, if not, the next time attendance event is retrieved and processed.

In the event that the time attendance event is determined to be a stop event time, it is determined that the previous time record does not have a stop time and that it is within the maximum time span allowed for the user associated with the time attendance event. If so, the previous time record is closed with the received time attendance event stop time. However, if not, it is determined whether there is a previous time record. If so, it is determined whether the received time attendance event stop time is inserted into the previous time record. However, if there is not a previous time record, a new time record is created and the received time attendance event stop time is inserted as the stop time.

In the event that the time attendance event is a stop event time, either the previous time record has a stop time or the received time attendance event is outside of the maximum time span allowed, and there is a previous time record, it is determined if the received time attendance event stop time is between a completed time record. It is determined whether the completed time record has a known stop event time. A new time record is created and the received time attendance event time is inserted as the time record's stop time. The new time record start time is updated with an automatically assigned start time based on the time attendance event stop time. The stop time in the time recorder is overwritten with the received time attendance stop time.

However, if the received time attendance event stop time is between a completed time record, it is determined if the completed time record has a known stop event time. If not, the stop time in the time recorder is overwritten with the received time attendance stop time.

By following the logic tree described above, a chronological listing of time records having start times and stop times (whether known or assigned) is created, thus reconciling the asynchronous time attendance event records from the individual time attendance recorder devices.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
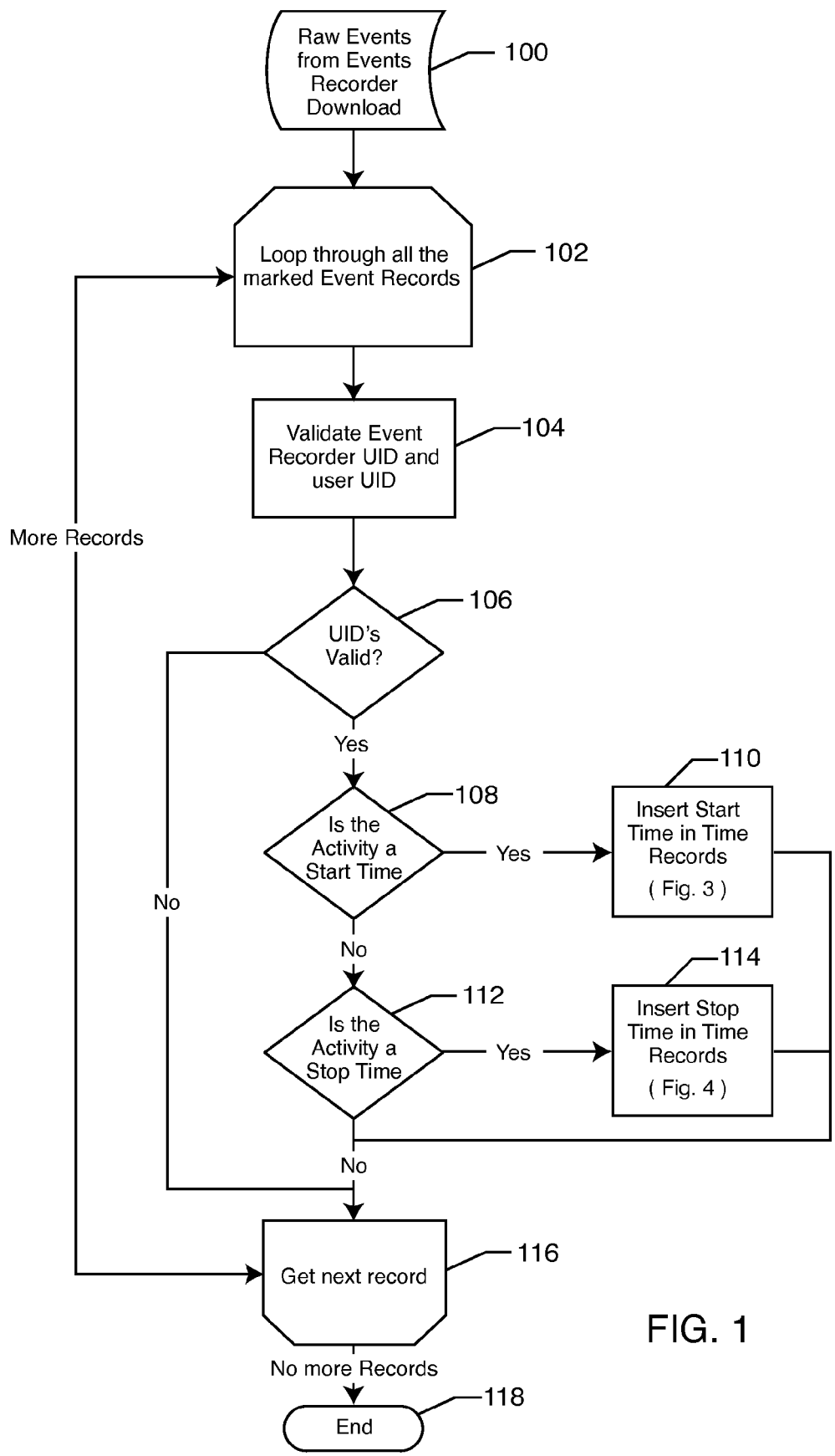
FIG. 1 is a flow chart depicting the steps generally taken in accordance with the present invention.

As shown in the accompanying drawings, for purposes of illustration, the present invention is concerned with a method for reconciling asynchronous time attendance records in an automated fashion. The reconciliation method of the present invention is particularly adapted to those time attendance systems having time attendance recorder devices that store and track time attendance events electronically, and have time attendance recorders located at multiple geographic locations and which are not electronically connected to one another or a central processor. However, as will be more fully described herein, the present invention could be used with as few as a single time attendance recorder device in which the time attendance events are received in an asynchronous manner.

Although not limited to such, the reconciliation method of the present invention is particularly suited for the time attendance system described and detailed in pending U.S. patent application Ser. No. 11/306,278, the contents of which are incorporated herein by reference. In this system, there are one or more time event recorders or clocks. Each time event recorder is activated by a touch button, also known as an event marker. Each event marker has an element on an end thereof which is capable of being read and transmitting a code representing the identity of the event marker, and thus the user, so that the time for that particular employee can be monitored as the event marker is brought into contact with the time attendance recorder device. The time attendance recorder devices are self-powered and portable, and are not electronically interconnected with each other, nor a central processor. Typically, an employee will have at least two event markers, a "start" or in event marker, and a "stop" or out event marker. The employee may have additional event markers, which identify the particular job function the employee is clocking in and out for. For example, in the construction industry, the employee may have an event marker for concrete work, framing, finish work, etc. In this manner, the employee can be billed out at different rates, or even paid different rates, for the time spent in the separate functions. Even if this is not the case, the employer may like to track the time of framing, travel, interior carpentry, etc. that the employee performs.

Periodically, such as every week or two, the time attendance events from the recorder device are downloaded. In the case of the time attendance system described above, this is typically done in a wireless manner by the use of a hand-held electronic device, such as a Palm Pilot™ or the like. The hand-held device containing the time attendance events from the one or more time attendance event recorders is then interfaced with a computer, such as a laptop or desktop computer. The time attendance records are then downloaded for analysis and the creation of time attendance timesheets for each employee over the period of time. As the time attendance events are downloaded, they are typically inserted into a holding area. This must occur because usually the time attendance event records are out of order and need to be reconciled.

The following scenario shows how reconciliation must occur, even at a single job site:
(1) Bill touches his "In" event marker to the "Elm St" Event Recorder at 8:00 am.
(2) Bill touches his "Framing" event marker to the "Elm St" Event Recorder at 11:30 am.
(3) Bill touches his "Out" event marker to the "Elm St" Event Recorder at 4:00 pm.

In traditional systems, a payroll manager may end up with these Time Records:

| Bill - Elm St | | | |
|---|---|---|---|
| In | 0800 | | 0.0 |
| Framing | 1130 | 1600 | 4.5 |

The payroll manager would have to go in and enter an ending time of 11:30 for Bill's "In", however, incorporating the reconciliation method of the present invention into software of the computer yields the following time records automatically:

| Bill - Elm St | | | |
|---|---|---|---|
| In | 0800 | 1130 | 3.5 |
| Framing | 1130 | 1600 | 4.5 |

You have the correct time that Bill worked for that day.

The situation becomes even more complex for the payroll manager when data is collected from one event recorder or time clock on one day, and then the second time attendance clock on another day. In fact, moving between job sites and clocking in and out of two time attendance clocks or event recorders between the job sites also becomes very complicated for the payroll administrator, as shown in the following example:
a. Bill touches his "In" event marker to the "Elm St" Event Recorder at 8:00 am;
b. Bill touches his "Travel" event marker to the "Elm St" Event Recorder at 11:30 am;
c. Bill touches his "Framing" event marker to the "Oak St" Event Recorder at 12:00 am;
d. Bill touches his "Out" event marker to the "Oak St" Event Recorder at 1:30 pm;
e. Bill touches his "Framing" event marker to the "Oak St" Event Recorder at 2:00 pm;
f. Bill touches his "Travel" event marker to the "Oak St" Event Recorder at 3:00 pm;
g. Bill touches his "Framing" event marker to the "Elm St" Event Recorder at 3:30 pm;
h. Bill touches his "Out" event marker to the "Elm St" Event Recorder at 4:30 pm.

The company on Tuesday receives all the data from the "Elm St" Event Recorder and that is imported into the system. This would result in this data:

| Bill - Elm St | | | |
|---|---|---|---|
| In | 0800 | 1130 | 3.5 |
| Travel | 1130 | 1530 | 5.0 |
| Framing | 1530 | 1630 | 1.0 |

As you can see this isn't the correct data. Bill wasn't traveling for 4.0 hours and he has a half hour lunch at 1:30 pm. This shows him working for 8.5 hours which is also incorrect. Then the next day you get the data from the "Oak St" Event Recorder and that data is then synchronized and reconciled. The present invention would reconcile the data and result in the following:

| Bill - Elm St | | | |
|---|---|---|---|
| In | 0800 | 1130 | 3.5 |
| Travel | 1130 | 1200 | 0.5 |
| Framing | 1530 | 1630 | 1.0 |
| Bill - Oak St | | | |
| Framing | 1200 | 1330 | 1.5 |
| Framing | 1400 | 1500 | 1.0 |
| Travel | 1500 | 1530 | 0.5 | which shows the correct times at each location and only 8.0 hours of work.

The foregoing two examples use the time attendance systems described above in association with event markers which indicate "In", "Travel", "Framing", and "Out". However, the time reconciliation method of the present invention can also be used in other time attendance systems. For example, there are time attendance systems which only require an employee to swipe an encoded card, such as a magnetic stripe card or a RFID chip card or the like. Alternatively, the employee may log in using a keypad or the like with a unique code. Such a swipe or login only registers the fact that that particular worker created a time attendance event at that particular time. Typically, these are created and treated as a "start activity" by the present invention which then analyzes and reconciles the plurality of "start activities" to create time records having both a start time and a stop time.

With reference now to FIG. 1, regardless of the type of time attendance system incorporating the methodology of the present invention, the raw events (time attendance events) from each event recorder (time clock) is downloaded (100). All of the marked time event records are looped through (102). In accordance with the methodology of the present invention, each worker must be assigned a unique identifying code. Moreover, each event recorder has its own unique identifying code. The event recorder identifying codes and the event marker user identifying codes are validated (104). In the time event recorder, each time attendance event includes not only the time of the event, but also the event recorder's unique identifying code as well as the user's unique identifying code. These codes are compared to a database of known codes so that they may be validated (106). If they are, each time attendance event can be processed. The invention determines whether the activity of the time attendance event is a start time (108). If so, the start time is processed in accordance with a logic tree more fully described in relation to FIG. 3 (110). However, if the activity is determined to be a stop time (112), then a logic tree or flow is used to process the time attendance event in accordance with the steps more fully described herein with respect to FIG. 4 (114). This is done with all of the time attendance events, or records (116) and so there are no more records and the process is completed (118).

Figure 2:
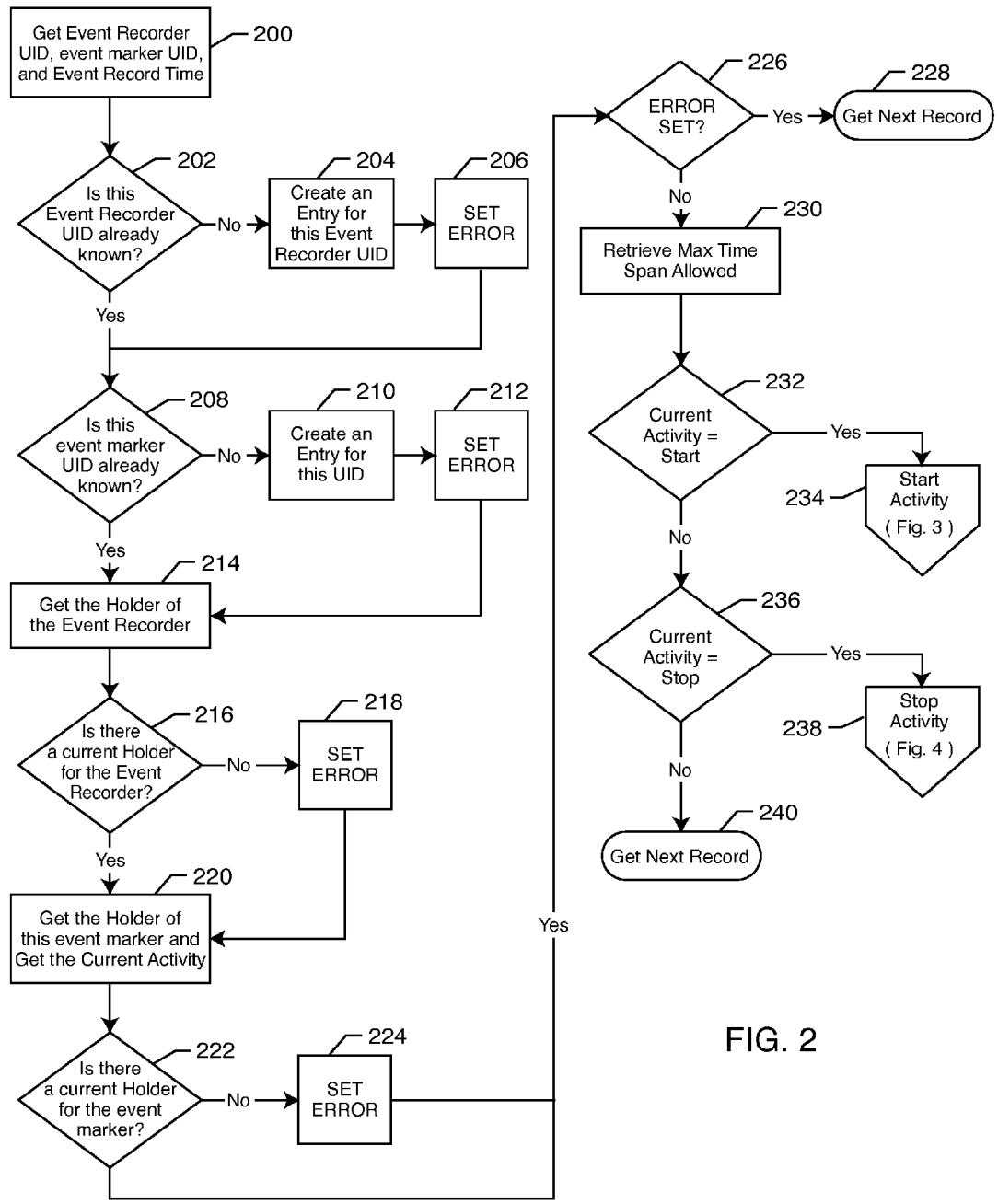
FIG. 2 is a flow chart depicting the steps taken in accordance with the present invention in greater detail.

With reference now to FIG. 2, a more detailed description of this processing is shown. It will be appreciated by those skilled in the art that each time attendance event must be analyzed and processed to determine the who, what, and where by using the identification of the event recorder and the user's unique identifying code, both of which must be validated. For each time attendance event record processed, the invention determines the event recorder unique identifying code, the user unique identifying code, and the event record time (200). The invention then determines if the event recorder's unique identifying code is already known (202). If not, the invention creates an entry for this event recorder by assigning it a unique identifying code (204), but an error message is set (206), notifying the payroll administrator or other user of the system of the discrepancy.

After this is done, or if the event recorder's unique identifying code was verified by matching an existing known code in a database, the invention then determines whether the event marker (user) unique identification code is known (208). If not, the invention creates an entry, or in other words assigns a unique identifying code, to this user/event marker (210). An error message is set (212), to notify the payroll administrator of the discrepancy.

As used herein, the phrases "event record time", "time attendance event time", and the like are meant to be synonymous. Such a time refers to the actual time recorded when the time clock recorded the start or stop or other activity, such as by swiping a card, inputting a code, placing a key tab in close relation to a reader, etc. "Event recorder", "time attendance recorder", or "time attendance device" are meant to be synonymous and refer in more general terms to the time clock. "Event marker UID" refers to a unique identifying code for the user. This may be in the form of an event marker, such as the key tabs described above, a swipe card, manually-entered code, or the like.

Once the event recorder's identifying code and the user's identifying code are verified, or assigned, the invention gets the holder of the event recorder (214) by determining if there is a current holder for the event recorder (216). If not, an error is set (218). The holder of the event marker and the current activity are then retrieved (220). The system determines whether there is a current holder for the event marker (222), that is, if there is a matching employee. If not, an error is set (224). If an error is set (226) in that either the event recorder or the user identification is unknown (226), then the invention retrieves the next record (228) as this time attendance event or record cannot be processed.

A valid time record or attendance event cannot be created without a valid holder, location and activity. Without all these three pieces of information, the time attendance record or event is meaningless as it can only be determined when the event occurred, but it cannot be determined who caused the event to occur or on which time attendance clock the event occurred. Typically, the system will assign a time recorder event or a time recorder user identification and a user identification code so that the billing supervisor can later retrieve these records for processing. For example, it may be that a new time attendance clock or recording device has been instituted but which has not been assigned a unique identifying code, or the unique identifying code to which it has been assigned or the device's location has not been entered into the database. In that case, there will be an error message for all of the time attendance events or records emanating from this recorder device. The billing supervisor will be able to see this error, and either assign it a unique identifying code or update the database to include the identifying code so that the records can be processed. This may also occur with a new employee under similar circumstances.

With continuing reference to FIG. 2, if no errors are set, then the maximum time span allowed is retrieved (230). This is typically a pre-set time frame. It can be user specific, such that a user is only allowed to have in and out times spanning over a predetermined time frame, such as eight or twelve hours. More typically, however, this is a system-wide time span used for the purpose of reconciling the time records of the invention. For example, the system might set a maximum time span of twenty or twenty-two hours. In this fashion, the invention can determine if time attendance events falling outside of this range actually occurred on different days and should be treated separately from one another. This value is the longest amount of time in hours that is allowed for a start activity or stop activity time to close off a time record. This step will discover that the employee has not worked twenty-two of twenty-four hours, for example.

The invention then determines if the current time attendance activity is a start activity (232). If so, the time attendance event is processed in accordance with the steps illustrated in relation to FIG. 3 (234). However, if the system determines that the current time attendance activity is a stop activity (236), then the time attendance event is further processed in accordance with the flow chart illustrated in FIG. 4 (238), before retrieving the next record (240).

As part of the processing of each time attendance event or record, the invention first tries to determine whether the time attendance event is a start event time or a stop event time. If the time attendance system utilizes event markers, key tabs, or the like or clocking in or starting an activity, or clocking out or stopping an activity, this can be easily ascertained with the code associated with the event marker, key tab, etc. However, there are other cases, as described above, where there is not a separate event marker or key tab, and instead the worker simply manually logs in using a key tab, swipes a magnetically striped card or an electronic chip or the like. In such a case, each time attendance event or record will be considered a "start activity". Notwithstanding this, the method of the present invention creates completed time records having a start time and a stop time in a chronological fashion so as to reconcile these records.

Figure 3:
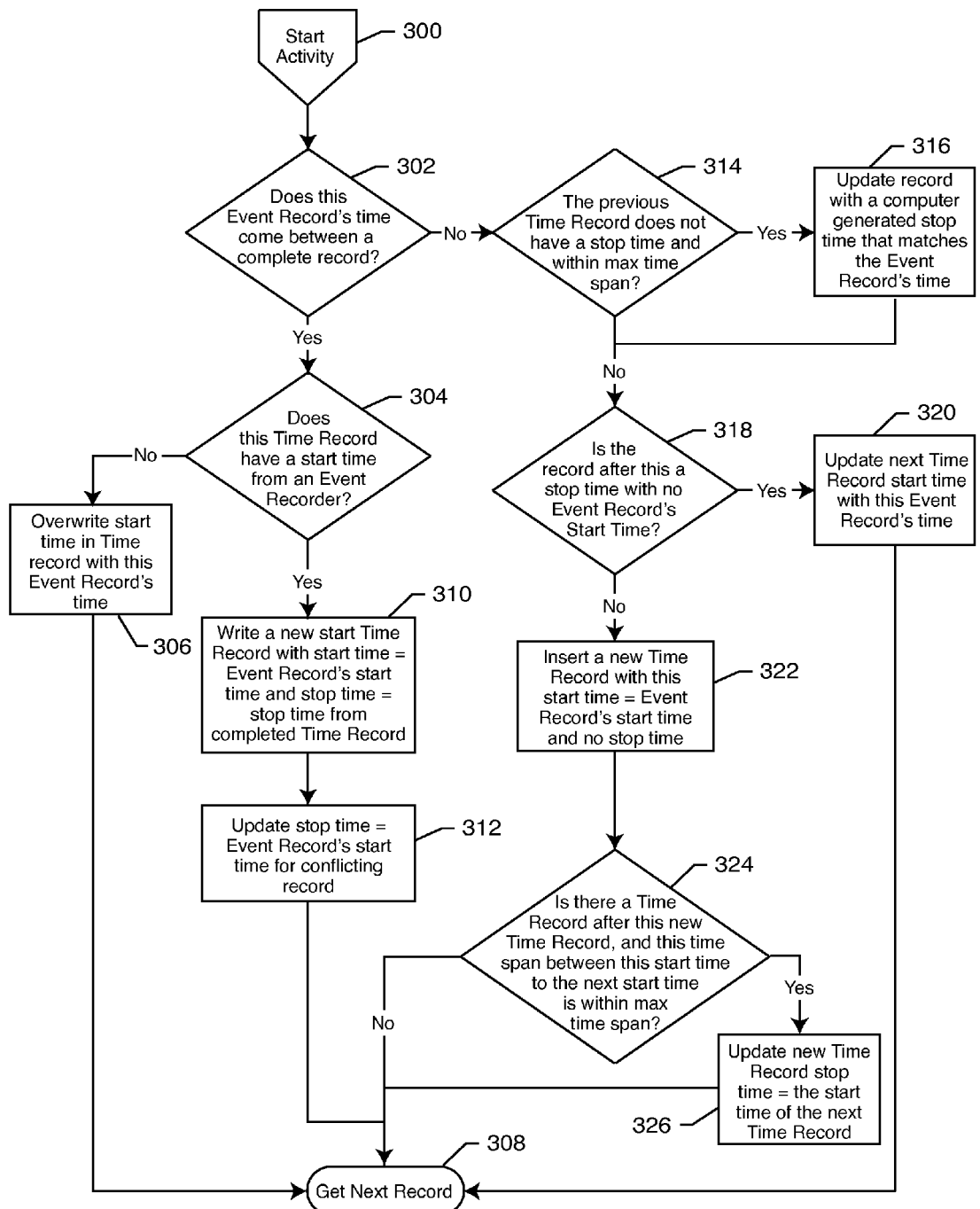
FIG. 3 is a flow chart depicting the steps in processing a start activity, in accordance with the present invention.

With reference now to FIG. 3, a flowchart is illustrated representing a logic tree of eight different paths that a "start activity" or "start event record" can take as it is processed in order to create a time record which will result in a known or assigned start time, and a known or assigned stop time. It is the plurality of completed time records arranged in chronological order which yields a reconciled timesheet for the user. As will be more fully described herein, the invention creates a grid of individual rows, representing a time record to be completed. The grid also includes columns representing the row identification (row 1, 2, 3, etc.), Event Start Time (known start time), Start Time (may be assigned automatically by systems), Event Stop Time (known stop time) and Stop Time (which may be automatically assigned by the invention). As will be more fully described below, start times or stop times which have been automatically assigned or generated by the invention can be replaced with event start times or event stop times as these become known. In certain instances, missing start event times and stop event times are assigned a start time or stop time to complete a time record, such as by automatically assigning the start time or stop time corresponding to an immediately preceding or immediately following known start event time or stop event time. When an accurate or known start event time or stop event time is received, the assigned start time or stop time is replaced with the known and accurate received start event time or stop event time. Thus, as all of the time attendance events from the one or more time attendance recorders is processed, completed time records will be generated in a chronological fashion.

As mentioned above, there are eight different paths that a start event record may take. In a first path, it is determined whether the event record's time comes between a completed record (302). If so, it is then determined whether the time record has a start time from an event recorder (304). That is, the completed record's start time is not from an event recorder, or is not known, and thus has been assigned. The invention overwrites the start time in the time record with this event record's (time attendance events) time (306) before retrieving the next record to be processed (308).

The following example illustrates a scenario where this pathway may take place:

Example of Path 1

Setup

The Event Record comes between a completed Time Record; however the conflicting Time Record doesn't have a Start Time from an Event Record. You have these Time Records:

| Row ID | Event Start Time | Start Time | Event Stop Time | Stop Time |
|---|---|---|---|---|
| 1 | | 1/30 8:00 AM | 1/30 12:00 PM | 1/30 12:00 PM |

The maximum time span allowed is set to 22 hours.
The current Event Record is a Start activity for 1/30 8:30 AM.
Flow
Step 302
Row ID 1 is the next Time Record and the Event Record of 1/30 8:30 AM is between 1/30 8:00 AM and 1/30 12:00 PM.
Step 304
The Time Record doesn't have a Start Time from an Event Record. The Start Time is a calculated time or a manually entered time.
Step 306
Update the Start Time in Row ID 1 using the Event Record.
Results:

| Row ID | Event Start Time | Start Time | Event Stop Time | Stop Time |
|---|---|---|---|---|
| 1 | 1/30 8:30 AM | 1/30 8:30 AM | 1/30 12:00 PM | 1/30 12:00 PM |

Step 308
Get the next Event Record.

Another path that the time attendance event can take is that the time attendance event time comes between a complete record (302), and that the completed record's time has a start time from an event recorder, that is it is a known start time (304). The invention creates a new row, or a new time record with a start time equaling the time attendance event record's start time that is currently being processed, and a stop time which equals the stop time from the completed time record (310). The stop time is then updated to be the event record's start time for the conflicting record (312), before retrieving the next record to be processed (308).

An example of this second path is given as follows:
Setup
The event record does come between a completed time record; however the conflicting time record does have a start time from an event record.
You have these Time Records:

| Row ID | Event Start Time | Start Time | Event Stop Time | Stop Time |
|---|---|---|---|---|
| 1 | 1/30 7:00 AM | 1/30 7:00 AM | 1/30 12:00 PM | 1/30 12:00 PM |

The maximum time span allowed is set to 22 hours.
The current Event Record is a Start activity for 1/30 8:00 AM.
Flow
Step 302
Row ID 1 is the next Time Record and the Event Record of 1/30 8:00 AM is between 1/30 7:00 AM and 1/30 12:00 PM.
Step 304
The Time Record does have a Start Time from an Event Record 1/30 7:00 AM.
Step 310
Create a new Time Record with the Start Time of 1/30 8:00 AM and an Event Stop Time of 1/30 12:00 PM.
Results:

| Row ID | Event Start Time | Start Time | Event Stop Time | Stop Time |
|---|---|---|---|---|
| 1 | 1/30 7:00 AM | 1/30 7:00 AM | 1/30 12:00 PM | 1/30 12:00 PM |
| 2 | 1/30 8:00 AM | 1/30 8:00 AM | | 1/30 12:00 PM |

Step 312
Update the Stop Time in Row ID 1 based on the Event Record.
Results:

| Row ID | Event Start Time | Start Time | Event Stop Time | Stop Time |
|---|---|---|---|---|
| 1 | 1/30 7:00 AM | 1/30 7:00 AM | | 1/30 8:00 AM |
| 2 | 1/30 8:00 AM | 1/30 8:00 AM | 1/30 12:00 PM | 1/30 12:00 PM |

Note:
The Event Stop Time of Row ID 1 is empty because the Stop Time for this record was calculated by the computer.

Step 308
Get the next Event Record.
Yet another pathway that the time attendance event can take while it is processed is that the time attendance event's record time does not come between a completed time record (302). The invention then determines if the previous time record does not have a stop time, and if it is within the maximum time span (314). If both of these conditions are met, then the invention updates the record with a computer-generated, or assigned, stop time that matches the event record's time (316). The invention then determines if the record after this is a stop time with no event record's start time (318). If so, the invention updates the next time record's start time with this event record's time (320), before retrieving the next record to be processed (308).

The following illustrates an example of this third pathway:
Setup
The previous Time Record has an Event Start Time but doesn't have a Stop Time and next Time Record has an Event Stop Time with no Event Start Time, but instead a calculated or manually entered Start Time
You have these Time Records:

| Row ID | Event Start Time | Start Time | Event Stop Time | Stop Time |
|---|---|---|---|---|
| 1 | 1/30 8:00 AM | 1/30 8:00 AM | | |
| 2 | | 1/30 11:00 AM | 1/30 12:00 PM | 1/30 12:00 PM |

The maximum time span allowed is set to 22 hours.
The current Event Record is a Start activity for 1/30 10:00 AM.
Flow
Step 302
The Event Record doesn't come between a Start and Stop Time.
Step 314
Row ID 1 doesn't have a stop time and it is within the maximum time span allowed.
Step 316
Update the Stop Time in Row ID 1 based on the Event Record.
Results:

| Row ID | Event Start Time | Start Time | Event Stop Time | Stop Time |
|---|---|---|---|---|
| 1 | 1/30 8:00 AM | 1/30 8:00 AM | | 1/30 10:00 AM |
| 2 | | 1/30 11:00 AM | 1/30 12:00 PM | 1/30 12:00 PM |

Note:
The Event Stop Time of Row ID 1 is empty because the Stop Time for this record was calculated by the computer.

Step 318
Row ID 2 has a Stop Time, but it doesn't have a Start Time with an Event Start Time. The Start Time is a calculated time or a manually entered time.
Step 320
Update the Start Time in Row ID 2 based on the Event Record.
Results:

| Row ID | Event Start Time | Start Time | Event Stop Time | Stop Time |
|---|---|---|---|---|
| 1 | 1/30 8:00 AM | 1/30 8:00 AM | | 1/30 10:00 AM |
| 2 | 1/30 10:00 AM | 1/30 10:00 AM | 1/30 12:00 PM | 1/30 12:00 PM |

Step 308
Get the next Event Record.

Yet another pathway that the time attendance event record's "start time" can be processed is that it is determined that the event record's time does not come between a completed time record (302). It is also determined that the previous time record does not have a stop time and is within the maximum time span (314). The record is updated with a computer-generated, or assigned, stop time that matches the event record's time (316). It is then determined that the record after this has a stop time and it has a start time with an event start time (318). A new time record is created with the start time equaling this event record start time, but without a stop time (322). It is then determined if there is a time record after this new time record, and the time span between this start time to the next start time is within the maximum time span set. If not, the next record is retrieved (308) for processing.

The following is an example of a time attendance event (event record's time) which is processed according to this fourth pathway:
Setup
The previous Time Record has an Event Start Time but doesn't have a Stop Time and next Time Record has an Event Stop Time with an Event Start Time.
You have these Time Records:

| Row ID | Event Start Time | Start Time | Event Stop Time | Stop Time |
|---|---|---|---|---|
| 1 | 1/30 8:00 AM | 1/30 8:00 AM | | |
| 2 | 1/31 11:00 AM | 1/31 11:00 AM | 1/31 12:00 PM | 1/31 12:00 PM |

The maximum time span allowed is set to 22 hours.
The current Event Record is a Start activity for 1/30 10:00 AM.
Flow
Step 302
The Event Record doesn't come between a Start and Stop Time.
Step 314
Row ID 1 doesn't have a stop time and it is within the maximum time span allowed.
Step 316
Update the Stop Time in Row ID 1 based on the Event Record.
Results:

| Row ID | Event Start Time | Start Time | Event Stop Time | Stop Time |
|---|---|---|---|---|
| 1 | 1/30 8:00 AM | 1/30 8:00 AM | | 1/30 10:00 AM |
| 2 | 1/31 11:00 AM | 1/31 11:00 AM | 1/31 12:00 PM | 1/31 12:00 PM |

Note:
The Event Stop Time of Row ID 1 is empty because the Stop Time for this record was calculated by the computer.

Step 318
Row ID 2 has a Stop Time and it does have a Start Time with an Event Start Time.
Step 322
Create a new Time Record with the Start Time of 1/30 10:00 AM.

Results:

| Row ID | Event Start Time | Start Time | Event Stop Time | Stop Time |
|---|---|---|---|---|
| 1 | 1/30 8:00 AM | 1/30 8:00 AM | | 1/30 10:00 AM |
| 2 | 1/31 11:00 AM | 1/31 11:00 AM | 1/31 12:00 PM | 1/31 12:00 PM |
| 3 | 1/30 10:00 AM | 1/30 10:00 AM | | |

Step 324
Row ID 2 is after the new Time Record for this Event Record; however it isn't within the maximum time span allowed (1/30 10:00 AM to 1/31 11:00 AM is 25 hours).
Step 308
Get the next Event Record.

The time attendance event record's time can be processed according to a fifth pathway through the flowchart, wherein the event record's time does not come between a computed time record (302). The previous time record does not have a stop time, and it is within the maximum time span allowed (314). The record is updated with a computer-generated stop time that matches the event record's time (316). The record after this is a stop time and it does have a start time with a known event start time (318). A new time record is inserted with the event record's start time being the start time and no stop time (322). It is then determined that there is a time record after this new time record, and the time span between this start time and the next start time is within the maximum time span (324). The new time record stop time is updated to equal the start time of the next time record (326), before retrieving the next record to be processed (308).

The following illustrates an example of this fifth pathway:
Setup
The previous Time Record has a Start Time but doesn't have a Stop Time and next Time Record has a Stop Time with an Event Start Time.
You have these Time Records:

| Row ID | Event Start Time | Start Time | Event Stop Time | Stop Time |
|---|---|---|---|---|
| 1 | 1/30 8:00 AM | 1/30 8:00 AM | | 1/30 10:00 AM |
| 2 | 1/30 11:00 AM | 1/30 11:00 AM | 1/30 12:00 PM | 1/30 12:00 PM |

The maximum time span allowed is set to 22 hours.
The current Event Record is a Start activity for 1/30 10:00 AM.
Flow
Step 302
The Event Record doesn't come between a Start and Stop Time.
Step 314
Row ID 1 doesn't have a stop time and it is within the maximum time span allowed.
Step 316
Update the Stop Time in Row ID 1 based on the Event Record.
Results:

| Row ID | Event Start Time | Start Time | Event Stop Time | Stop Time |
|---|---|---|---|---|
| 1 | 1/30 8:00 AM | 1/30 8:00 AM | | 1/30 10:00 AM |
| 2 | 1/30 11:00 AM | 1/30 11:00 AM | 1/30 12:00 PM | 1/30 12:00 PM |

Note:
The Event Stop Time of Row ID 1 is empty because the Stop Time for this record was calculated by the computer.

Step 318
Row ID 2 has a Stop Time and it does have a Start Time with an Event Start Time.
Step 322
Create a new Time Record with the Start Time of 1/30 10:00 AM.
Results:

| Row ID | Event Start Time | Start Time | Event Stop Time | Stop Time |
|---|---|---|---|---|
| 1 | 1/30 8:00 AM | 1/30 8:00 AM | | 1/30 10:00 AM |
| 2 | 1/30 11:00 AM | 1/30 11:00 AM | 1/30 12:00 PM | 1/30 12:00 PM |
| 3 | 1/30 10:00 AM | 1/30 10:00 AM | | |

Step 324
Row ID 2 is after the new Time Record for this Event Record and it is within the maximum time span allowed (1/30 10:00 AM to 1/30 11:00 AM is 1 hour).
Step 326
Update the Stop Time of Row ID 3 based on the Start Time of the next Time Record (Row ID 2).
Results:

| Row ID | Event Start Time | Start Time | Event Stop Time | Stop Time |
|---|---|---|---|---|
| 1 | 1/30 8:00 AM | 1/30 8:00 AM | | 1/30 10:00 AM |
| 2 | 1/30 11:00 AM | 1/30 11:00 AM | 1/30 12:00 PM | 1/30 12:00 PM |
| 3 | 1/30 10:00 AM | 1/30 10:00 AM | | 1/30 11:00 AM |

Note:
The Event Stop Time of Row ID 3 is empty because the Stop Time for this record was calculated by the computer.

Ordered Results:

| Row ID | Event Start Time | Start Time | Event Stop Time | Stop Time |
|---|---|---|---|---|
| 1 | 1/30 8:00 AM | 1/30 8:00 AM | | 1/30 10:00 AM |
| 3 | 1/30 10:00 AM | 1/30 10:00 AM | | 1/30 11:00 AM |
| 2 | 1/30 11:00 AM | 1/30 11:00 AM | 1/30 12:00 PM | 1/30 12:00 PM |

Step 308
Get the next Event Record.

A sixth pathway that the time attendance record time could take as it is processed through this flowchart is when it is determined that the event record's time does not come between a completed time record (302). The previous time record has a stop time (314), and the time record has a stop time as well as an event start time (318). A new time record is inserted or created with the start time equaling the event record's start time, and without a stop time (322). It is then determined whether there is a time record after this new time record, and whether the time span between the next start time is within the maximum time span (324). If not, the system retrieves the next record to be processed (308).

As an illustrative example of this sixth pathway, the following is provided:
Setup
The previous Time Record has a Start Time and does have a Stop Time and next Time Record has a Stop Time with an Event Start Time.

You have these Time Records:

| Row ID | Event Start Time | Start Time | Event Stop Time | Stop Time |
|---|---|---|---|---|
| 1 | 1/30 8:00 AM | 1/30 8:00 AM | 1/30 10:00 AM | 1/30 10:00 AM |
| 2 | 1/31 3:00 PM | 1/31 3:00 PM | 1/31 5:00 PM | 1/31 5:00 PM |

The maximum time span allowed is set to 22 hours.
The current Event Record is a Start activity for 1/30 1:00 PM.
Flow
Step 302
The Event Record doesn't come between a Start and Stop Time.
Step 314
The previous Time Record (Row ID 1) does have a Stop Time.
Step 318
Row ID 2 has a Stop Time and it does have a Start Time with an Event Start Time.
Step 322
Create a new Time Record with the Start Time of 1/30 1:00 PM.
Results:

| Row ID | Event Start Time | Start Time | Event Stop Time | Stop Time |
|---|---|---|---|---|
| 1 | 1/30 8:00 AM | 1/30 8:00 AM | 1/30 10:00 AM | 1/30 10:00 AM |
| 2 | 1/31 3:00 PM | 1/31 3:00 PM | 1/31 5:00 PM | 1/31 5:00 PM |
| 3 | 1/30 1:00 PM | 1/30 1:00 PM | | |

Step 324
Row ID 2 is after the new Time Record for this Event Record; however and it isn't within the maximum time span allowed (1/30 1:00 PM to 1/31 3:00 PM is 26 hours).
Step 308
Get the next Event Record.

Yet another seventh pathway that a time attendance record's time can take as it is processed through this flowchart is that it is determined that the event record's time does not come between a completed record (302). The previous record does have a stop time (314), and the record after this has a stop time and it does have a start time which is known (318). A new time record is inserted with the start time equaling the event record's start time which is being processed, but without a stop time (322). It is then determined that there is a time record after this new time record, and the time span between this start time to the next start time is within the maximum time span (324), resulting in updating the new time record's stop time with the start time of the next time record (326), before retrieving the next record to be processed (308).

An illustrative example of this seventh pathway is as follows:
Setup
The previous Time Record has a Start Time and does have a Stop Time and next Time Record has a Stop Time with an Event Start Time.

You have these Time Records:

| Row ID | Event Start Time | Start Time | Event Stop Time | Stop Time |
|---|---|---|---|---|
| 1 | 1/30 8:00 AM | 1/30 8:00 AM | 1/30 10:00 AM | 1/30 10:00 AM |
| 2 | 1/30 3:00 PM | 1/30 3:00 PM | 1/30 5:00 PM | 1/30 5:00 PM |

The maximum time span allowed is set to 22 hours.
The current Event Record is a Start activity for 1/30 1:00 PM.
Flow
Step 302
The Event Record doesn't come between a Start and Stop Time.
Step 314
The previous Time Record (Row ID 1) does have a Stop Time.
Step 318
Row ID 2 has a Stop Time and it does have a Start Time with an Event Start Time.
Step 322
Create a new Time Record with the Start Time of 1/30 1:00 PM.
Results:

| Row ID | Event Start Time | Start Time | Event Stop Time | Stop Time |
|---|---|---|---|---|
| 1 | 1/30 8:00 AM | 1/30 8:00 AM | 1/30 10:00 AM | 1/30 10:00 AM |
| 2 | 1/30 3:00 PM | 1/30 3:00 PM | 1/30 5:00 PM | 1/30 5:00 PM |
| 3 | 1/30 1:00 PM | 1/30 1:00 PM | | |

Step 324
Row ID 2 is after the new Time Record for this Event Record; however and it is within the maximum time span allowed (1/30 1:00 AM to 1/30 3:00 AM is 2 hours).
Step 326
Update the Stop Time of Row ID 3 based on the Start Time of the next Time Record (Row ID 2).
Results:

| Row ID | Event Start Time | Start Time | Event Stop Time | Stop Time |
|---|---|---|---|---|
| 1 | 1/30 8:00 AM | 1/30 8:00 AM | 1/30 10:00 AM | 1/30 10:00 AM |
| 2 | 1/30 3:00 PM | 1/30 3:00 PM | 1/30 5:00 PM | 1/30 5:00 PM |
| 3 | 1/30 1:00 AM | 1/30 1:00 PM | | 1/30 3:00 PM |

Note:
The Event Stop time of Row ID 3 is empty because the Stop Time for this record was calculated by the computer.

Ordered Results:

| Row ID | Event Start Time | Start Time | Event Stop Time | Stop Time |
|---|---|---|---|---|
| 1 | 1/30 8:00 AM | 1/30 8:00 AM | 1/30 10:00 AM | 1/30 10:00 AM |
| 3 | 1/30 1:00 AM | 1/30 1:00 PM | | 1/30 3:00 PM |
| 2 | 1/30 3:00 PM | 1/30 3:00 PM | 1/30 5:00 PM | 1/30 5:00 PM |

Step 308
Get the next Event Record.
A final eighth pathway that the time attendance record's time can take through the flow diagram is the determination that the event record's time does not come between a completed time record, that is, it does not come between a start time and a stop time (302). The previous time record does have a stop time (314). The record after this is a stop time with no event record's start time, or known time from an event recorder (318). The invention then updates the next time record's start time with this event record's time (320), before retrieving the next record for processing (308).

The following illustrates an example of this eighth pathway:
Setup
The previous Time Record has a Start Time and a Stop Time and the next Time Record has a Stop Time with no Event Start Time.
You have these Time Records:

| Row ID | Event Start Time | Start Time | Event Stop Time | Stop Time |
|---|---|---|---|---|
| 1 | 1/30 8:00 AM | 1/30 8:00 AM | 1/30 9:00 AM | 1/30 9:00 AM |
| 2 | | 1/30 11:00 AM | 1/30 12:00 PM | 1/30 12:00 PM |

The maximum time span allowed is set to 22 hours.
The current Event Record is a Start activity for 1/30 10:00 AM.
Flow
Step 302
The Event Record doesn't come between a Start and Stop Time.
Step 314
The previous Time Record (Row ID 1) does have a Stop Time.
Step 318
Row ID 2 has a Stop Time, but it doesn't have a Start Time with an Event Start Time. The Start Time is a calculated time or a manually entered time.
Step 320
Update the Start Time in Row ID 2 based on the Event Record.
Results:

| Row ID | Event Start Time | Start Time | Event Stop Time | Stop Time |
|---|---|---|---|---|
| 1 | 1/30 8:00 AM | 1/30 8:00 AM | 1/30 9:00 AM | 1/30 9:00 AM |
| 2 | 1/30 10:00 AM | 1/30 10:00 AM | 1/30 12:00 PM | 1/30 12:00 PM |

Step 308
Get the next Event Record.

In the event the time attendance system only utilizes a swipe card, or some other means of logging in with only a time which is considered to be a "start" time, the processing of each time attendance event record's time in accordance with the pathways described above in FIG. 3 will create a chronological set of completed time records with start times and stop times. The stop times are calculated and generated in accordance with the steps taken above. In the event that the time attendance system utilizes event markers or the like, a separate set of pathways are taken for time attendance events which are determined to be a stop event time. These pathways are illustrated in the flowchart of FIG. 4.

Figure 4:
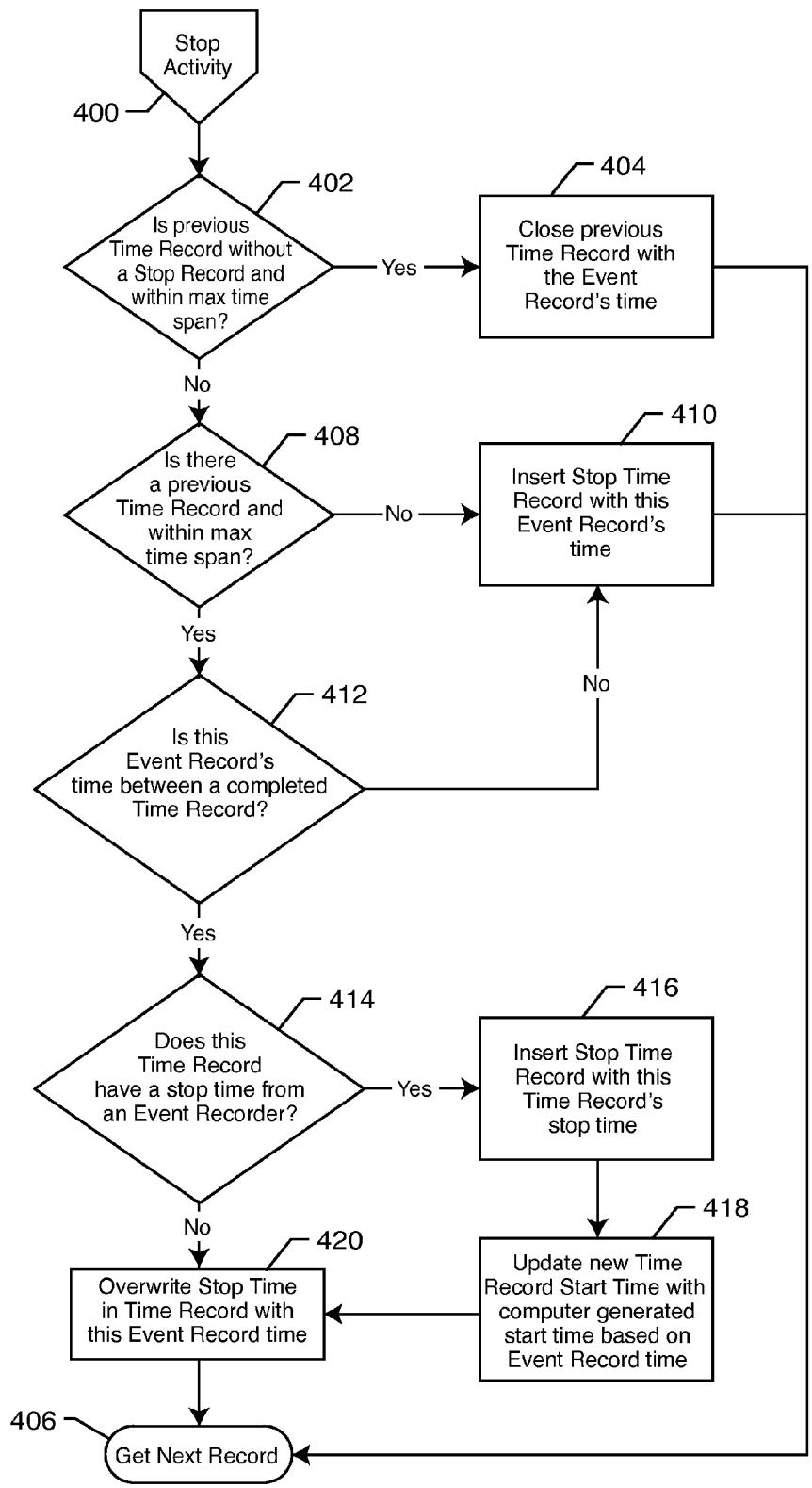
FIG. 4 is a flow chart depicting the steps taken in processing a stop activity in accordance with the present invention.

With reference to FIG. 4, the invention determines that the time attendance event time is a stop activity (400). The system then determines if the previous time record is without a stop record and within the maximum time span (402). If so, the previous time record is closed with the event record's time (404), before retrieving the next record to be processed (406).

An illustrative example of this pathway is as follows:
Setup
The previous Time Record doesn't have a Stop Time and the time span it would create is within the maximum time span allowed.
You have these Time Records:

| Row ID | Event Start Time | Start Time | Event Stop Time | Stop Time |
|---|---|---|---|---|
| 1 | 1/30 8:00 AM | 1/30 8:00 AM | | |

The maximum time span allowed is set to 22 hours.
The current Event Record is a Stop activity for 1/30 12:00 PM.
Flow
Step 402
Row ID 1 is the previous Time Record and it doesn't have a Stop Time and the time span (1/30 8:00 AM to 1/30 12:00 PM) of 4 hours is within the maximum time span allowed of 22 hours.
Step 404
Close out Row ID 1 with a Stop Time of 1/30 12:00 PM.
Results:

| Row ID | Event Start Time | Start Time | Event Stop Time | Stop Time |
|---|---|---|---|---|
| 1 | 1/30 8:00 AM | 1/30 8:00 AM | 1/30 12:00 PM | 1/30 12:00 PM |

Step 406
Get the next Event Record.

An alternative pathway is that the previous time record has a stop record, or is outside the maximum time span (402). The invention then determines if there is a previous time record which is within the maximum time span (408). If not, then the invention inserts a stop time record with this event record's time (410), before proceeding to the next record to be processed (406).

An illustrative example of this pathway is as follows:
Setup
The previous Time Record doesn't have a Stop Time and the time span it would create is greater than the maximum time span allowed.
You have these Time Records:

| Row ID | Event Start Time | Start Time | Event Stop Time | Stop Time |
|---|---|---|---|---|
| 1 | 1/30 8:00 AM | 1/30 8:00 AM | | |

The maximum time span allowed is set to 22 hours.
The current Event Record is a Stop activity for 1/31 12:00 PM.
Flow
Step 402
Row ID 1 is the previous Time Record and it doesn't have a Stop Time, but the time span is 28 hours which is greater than the maximum allowed time span.
Step 408
There is a previous record, but due to the maximum allowed time span that record is ignored.

Step 410
Create a new Time Record with the Stop Time of 1/31 12:00 PM.
Results:

| Row ID | Event Start Time | Start Time | Event Stop Time | Stop Time |
|---|---|---|---|---|
| 1 | 1/30 8:00 AM | 1/30 8:00 AM | | |
| 2 | | | 1/31 12:00 PM | 1/31 12:00 PM |

Step 406
Get the next Event Record.

Yet a third pathway that may be taken as the time attendance event is processed is that it is determined that the previous time record has a stop record, or is without the maximum time span (402). There is a previous time record that is within the maximum time span (408). It is then determined if this event record's time is between a completed time record (412). If not, the invention inserts the stop time record with this event record's time (410), before proceeding to the next record (406).

An illustrative example of this pathway is as follows:
Setup
The previous Time Record does have a Stop Time and the Event Record isn't between the Start and Stop Time.
You have these Time Records:

| Row ID | Event Start Time | Start Time | Event Stop Time | Stop Time |
|---|---|---|---|---|
| 1 | 1/30 8:00 AM | 1/30 8:00 AM | 1/30 12:00 PM | 1/30 12:00 PM |

The maximum time span allowed is set to 22 hours.
The current Event Record is a Stop activity for 1/30 5:00 PM.
Flow
Step 402
Row ID 1 is the previous Time Record and it does have a Stop Time.
Step 408
We do have a previous Time Record.
Step 412
The current Event Record of 1/30 5:00 PM is not between 1/30 8:00 AM and 1/30 12:00 PM.
Step 410
Create a new Time Record with the Stop Time of 1/30 5:00 PM.
Results:

| Row ID | Event Start Time | Start Time | Event Stop Time | Stop Time |
|---|---|---|---|---|
| 1 | 1/30 8:00 AM | 1/30 8:00 AM | 1/30 12:00 PM | 1/30 12:00 PM |
| 2 | | | 1/30 5:00 PM | 1/30 5:00 PM |

Step 406
Get the next Event Record.

A fourth possible pathway is that the previous time record does have a stop time (402), and there is a previous time record within the maximum time span (408). The event record's time comes between a completed time record (412). The stop time is from an event recorder (414). The invention inserts the stop time record with this time record's stop time (416), and updates the new time record start time with computer-generated, or assigned, start time based on the event record's time (418). The invention overwrites the stop time in the time record with this event record's time (420), before proceeding to the next record (406).

An illustrative example of this pathway is as follows:
Setup
The previous Time Record does have a Stop Time and the Event Record is between the Start and Stop Time and the Stop Time is from an Event Recorder.
You have these Time Records:

| Row ID | Event Start Time | Start Time | Event Stop Time | Stop Time |
|---|---|---|---|---|
| 1 | 1/30 8:00 AM | 1/30 8:00 AM | 1/30 5:00 PM | 1/30 5:00 PM |

The maximum time span allowed is set to 22 hours.
The current Event Record is a Stop activity for 1/30 12:00 PM.
Flow
Step 402
Row ID 1 is the previous Time Record and it does have a Stop Time.
Step 408
We do have a previous Time Record.
Step 412
The current Event Record of 1/30 12:00 PM is between 1/30 8:00 AM and 1/30 5:00 PM.
Step 414
The Time Record does have an Event Stop Time of 1/30 5:00 PM.
Step 416
Create a new Time Record with the Stop Time of 1/30 12:00 PM
Results:

| Row ID | Event Start Time | Start Time | Event Stop Time | Stop Time |
|---|---|---|---|---|
| 1 | 1/30 8:00 AM | 1/30 8:00 AM | 1/30 5:00 PM | 1/30 5:00 PM |
| 2 | | | 1/30 5:00 PM | 1/30 5:00 PM |

Step 418
Update the Start Time in Row ID 2 based on the Event Record.
Results:

| Row ID | Event Start Time | Start Time | Event Stop Time | Stop Time |
|---|---|---|---|---|
| 1 | 1/30 8:00 AM | 1/30 8:00 AM | 1/30 5:00 PM | 1/30 5:00 PM |
| 2 | | 1/30 12:00 PM | 1/30 5:00 PM | 1/30 5:00 PM |

Note:
The Event Start Time of Row ID 2 is empty because the Start Time for this record was calculated by the computer.

Step 420
Update the Stop Time in Row ID 1 using the Event Record.
Results:

| Row ID | Event Start Time | Start Time | Event Stop Time | Stop Time |
|---|---|---|---|---|
| 1 | 1/30 8:00 AM | 1/30 8:00 AM | 1/30 12:00 PM | 1/30 12:00 PM |
| 2 | | 1/30 12:00 PM | 1/30 5:00 PM | 1/30 5:00 PM |

Note:
The Event Stop time of Row ID 1 was set to the Event Record as this is the actual Event Record.

Step 406
Get the next Event Record.

A final fifth pathway that can be taken by a time attendance event determined to be a stop event time will now be described. The previous time record has a stop record (402). There is a previous time record that is within the maximum time span (408). This event record's time comes between a completed time record (412). However, this time record does not have a stop time from an event recorder (414), that is, it has been previously assigned and computer generated. Thus, the stop time in the time record is overwritten with this event record's time (420), before proceeding to the next record to be processed (406).

An illustrative example of this fifth pathway is as follows:
Setup
The previous Time Record does have a Stop Time and the Event Record is between the Start and Stop Time and the Stop Time is calculated or was manually entered, and not from an Event Recorder.
You have these Time Records:

| Row ID | Event Start Time | Start Time | Event Stop Time | Stop Time |
|---|---|---|---|---|
| 1 | 1/30 8:00 AM | 1/30 8:00 AM | | 1/30 12:00 PM |

The maximum time span allowed is set to 22 hours.
The current Event Record is a Stop activity for 1/30 11:45 AM.
Flow
Step 402
Row ID 1 is the previous Time Record and it does have a Stop Time. The Stop Time is a calculated time or a manually entered time.
Step 408
We do have a previous Time Record.
Step 412
The current Event Record of 1/30 11:45 AM is between 1/30 8:00 AM and 1/30 12:00 PM.
Step 414
The Time Record doesn't have an Event Stop Time.
Step 420
Update the Stop Time in Row ID 1 using the Event Record.
Results:

| Row ID | Event Start Time | Start Time | Event Stop Time | Stop Time |
|---|---|---|---|---|
| 1 | 1/30 8:00 AM | 1/30 8:00 AM | 1/30 11:45 AM | 1/30 11:45 AM |

Step 406
Get the next Event Record.

When each time attendance event (time recorder time) is analyzed and processed in accordance with the steps described above, time attendance events which are otherwise asynchronous will become synchronized and reconciled by the creation of completed time records, each time record having a start time and a stop time. As described above, with time records having a missing start event time or stop event time (a start time or stop time which is taken from a time attendance recorder device, and thus is known), the invention assigns a calculated start or stop time to complete the record. When a known start event time or stop event time is determined and retrieved from a time recorder device that should replace a computer-generated or assigned start time or stop time, the time record is overwritten so as to replace the computer-generated assigned start time or stop time, thus completing the record. This process occurs over and over until all of the time attendance event records have been analyzed and processed and a chronological set of completed time records is generated. From these chronological completed time records, an accurate and reconciled accounting of the time attendance for the worker over the given time period is created for the billing manager.

Although several embodiments have been described in some detail for purposes of illustration, various modifications may be made without departing from the scope and spirit of the invention. Accordingly, the invention is not to be limited, except as by the appended claims.

What is claimed is:

1. An automated method for reconciling asynchronous time attendance records, comprising the steps of:
providing time attendance recorders which are not in real time electronic communication with each other or a common central processor;
assigning each time attendance recorder a unique identifier;
assigning a unique identifying code for each of a plurality of users of a time attendance recorder;
logging in to a plurality of the time attendance recorders using the user identifying code;
for each log in, creating a time attendance event including the time corresponding with the log in and the user identifying code and the time attendance recorder identifier;
periodically electronically transferring time attendance events from the attendance recorders to a central processor in an asynchronous manner; and
processing by the processor each time attendance event for the time attendance recorder to create time attendance records for each user, including the steps of:
determining by the processor whether the time attendance event is a start event time or a stop event time;
for each user, creating chronological time records, each time record having a start time and a stop time;
for missing known start event times and stop event times, completing a time record by automatically assigning a start time or a stop time corresponding with another known event time; and
replacing by the processor the automatically assigned start or stop time when receiving an accurate start event time or stop event time.

2. The method of claim 1, wherein the processing step includes the steps of:
verifying user identifying code by comparing the user identifying code with a database of known user identifying codes; and
if unverified, assigning a user identifying code.

3. The method of claim 1, wherein the processing step includes the step of retrieving a maximum time span allowed for the user associated with the time attendance event.

4. The method of claim 1, wherein the step of automatically assigning a start time or stop time includes the step of automatically assigning a start time or stop time corresponding to an immediately preceding or following known start event time or stop event time.

5. The method of claim 1, wherein the processing step includes the steps of:
verifying the time attendance recorder by comparing the identifying code for the time attendance recorder from which the time attendance event was obtained to a database of known time attendance recorder identifying codes; and
if unverified, assigning an identifying code to the time attendance recorder.

6. The process of claim 1, wherein the processing step includes the steps of:
receiving a time attendance event and determining that it is a start event time;
determining if the start event time comes between a completed record;
if the start event comes between a completed record, determining if the completed time record has a known start event time from a time attendance recorder, or an automatically assigned start time; and
if the start event does not come between a completed record, determining if the previous time record has a stop time within the maximum time span allowed for the user associated with the time attendance event.

7. The process of claim 6, including the steps of:
if it is determined that the time record start time is a known start event time, creating a new time record with the received start event time as the start time and assigning the time record a stop time corresponding to the stop time of the previous completed time record.

8. The process of claim 6, including the steps of:
if the previous time record has a stop time within the maximum time span, updating the time record with an automatically assigned stop time that matches the received time attendance events time.

9. The process of claim 8, including the steps of:
determining that the immediately following time is not an assigned stop time, and creating a new time record having the received time attendance event time as the start time with no stop time; and
determining if there is a time record immediately following this new time record and if the time span between this start time and the next start time is within the maximum time span, and if not retrieving and processing the next time attendance event.

10. The process of claim 8, including the steps of:
determining that the immediately following time is an assigned stop time, and creating a new time record having the received time attendance event time as the start time with no stop time; and
determining if there is a time record immediately following this new time record and if so, updating the new time record stop time with the start time of the next time record.

11. The process of claim 6, including the steps of:
determining that the previous time record has a stop time within the maximum time span allowed for the user associated with the time attendance event, and determining if the immediately following time is an assigned stop time, and if not, creating a new time record having the received time attendance event time as the start time with no stop time; and
determining if there is a time record immediately following this new time record and if the time span between this start time and the next start time is within the maximum time span, and if not, retrieving and processing the next time attendance event.

12. The process of claim 6, including the steps of:
determining that the start event time comes between a completed record;
determining that the previous time record has a stop time within the maximum time span allowed for the user associated with the time attendance event, and determining if the immediately following time is an assigned stop time, and if not, creating a new time record having the received time attendance event time as the start time with no stop time; and determining if there is a time record immediately following this new time record and if the time span between this start time and the next start time is within the maximum time span, and if so, updating the new time record stop time with the start time of the next time record.

13. The process of claim 6, including the steps of:
determining that the start event time does not come between a completed record; and
determining if the previous time record has a stop time within the maximum time span allowed for the user associated with the time attendance event and if not, determining if the immediately following time is an assigned stop time and if so, updating the immediately following time record start time with the received time attendance event time.

14. The process of claim 1, wherein the processing step includes the steps of:
receiving a time attendance event and determining that it is a stop event time; and
determining that the previous time record does not have a stop time and is not within the maximum time span allowed for the user associated with the time attendance event.

15. The process of claim 14, including the steps of:
determining if there is a previous time record; and if not, creating a new time record and inserting the received time attendance event stop time as the stop time.

16. The process of claim 14, including the steps of:
determining if there is a previous time record;
if so, determining that the received time attendance event stop time is not between a completed time record; and
inserting received time attendance event stop time in previous time record.

17. The process of claim 14, including the steps of:
determining if there is a previous time record;
if so, determining that the received time attendance event stop time is between a completed time record;
determining that the completed time record has a known stop event time;
creating a new time record and inserting received time attendance event time as the time record's stop time;
updating the new time record start time with an automatically assigned start time based on time attendance event stop time; and
overwriting stop time in time recorder with the received time attendance stop time.

18. The process of claim 14, including the steps of:
determining if there is a previous time record; if so, determining that the received time attendance event stop time is between a completed time record;
determining that the completed time record does not have a known stop event time; and
overwriting stop time in time recorder with the received time attendance stop time.

19. An automated method for reconciling asynchronous time attendance records from a plurality of time attendance recorders which are not in electronic communication with each other or a central processor, comprising the steps of:
assigning each time attendance recorder a unique identifier;
assigning a unique identifying code for each of a plurality of users of a time attendance recorder; logging in to the time attendance recorder using the user identifying code;
for each log in, creating a time attendance event including the time corresponding with the log in, the user identifying code, and the time attendance recorder identifier;
periodically electronically transferring time attendance events from the attendance recorders to a central processor; and
processing by the processor each time attendance event for the time attendance recorders, including the steps of:
verifying user identifying code by comparing the user identifying code with a database of known user identifying codes;
if unverified, assigning a user identifying code;
verifying the time attendance recorder by comparing the identifying code for the time attendance recorder from which the time attendance event was obtained to a database of known time attendance recorder identifying codes; and
if unverified, assigning an identifying code to the time attendance recorder;
retrieving a maximum time span allowed for the user associated with the time attendance event;
determining by the processor whether the time attendance event is a start event time or a stop event time;
for each user, creating chronological time records, each time record having a start time and a stop time;
for missing known start event times and stop event times, completing a time record by automatically assigning a start time or a stop time corresponding with another known event time; and
replacing by the processor the automatically assigned start or stop time when receiving an accurate start event time or stop event time.

20. The method of claim 19, wherein the step of automatically assigning a start time or stop time includes the step of automatically assigning a start time or stop time corresponding to an immediately preceding or following known start event time or stop event time.

21. The process of claim 19, wherein the processing step includes the steps of:
receiving a time attendance event and determining that it is a start event time;
determining if the start event time comes between a completed record;
if the start event comes between a completed record, determining if the completed time record has a known start event time from a time attendance recorder, or an automatically assigned start time; and
if the start event does not come between a completed record, determining if the previous time record has a stop time within the maximum time span allowed for the user associated with the time attendance event.

22. The process of claim 21, including the steps of:
if it is determined that the time record start time is a known start event time, creating a new time record with the received start event time as the start time and assigning the time record a stop time corresponding to the stop time of the previous completed time record.

23. The process of claim 21, including the steps of:
if the previous time record has a stop time within the maximum time span, updating the time record with an automatically assigned stop time that matches the received time attendance events time.

24. The process of claim 23, including the steps of:
determining that the immediately following time is not an assigned stop time, and creating a new time record having the received time attendance event time as the start time with no stop time; and
determining if there is a time record immediately following this new time record and if the time span between this start time and the next start time is within the maximum time span, and if not retrieving and processing the next time attendance event.

25. The process of claim 23, including the steps of:
determining that the immediately following time is an assigned stop time, and creating a new time record having the received time attendance event time as the start time with no stop time; and
determining if there is a time record immediately following this new time record and if so, updating the new time record stop time with the start time of the next time record.

26. The process of claim 21, including the steps of:
determining that the previous time record has a stop time within the maximum time span allowed for the user associated with the time attendance event, and determining if the immediately following time is an assigned stop time, and if not creating a new time record having the received time attendance event time as the start time with no stop time; and
determining if there is a time record immediately following this new time record and if the time span between this start time and the next start time is within the maximum time span, and if not, retrieving and processing the next time attendance event.

27. The process of claim 21, including the steps of:
determining that the start event time comes between a completed record;
determining that the previous time record has a stop time within the maximum time span allowed for the user associated with the time attendance event, and determining if the immediately following time is an assigned stop time, and if not, creating a new time record having the received time attendance event time as the start time with no stop time; and
determining if there is a time record immediately following this new time record and if the time span between this start time and the next start time is within the maximum time span, and if so, updating the new time record stop time with the start time of the next time record.

28. The process of claim 21, including the steps of:
determining that the start event time does not come between a completed record; and
determining if the previous time record has a stop time within the maximum time span allowed for the user associated with the time attendance event and if not, determining if the immediately following time is an assigned stop time and if so, updating the immediately following time record start time with the received time attendance event time.

29. The process of claim 19, wherein the processing step includes the steps of:
   receiving a time attendance event and determining that it is a stop event time; and
   determining that the previous time record does not have a stop time and is not within the maximum time span allowed for the user associated with the time attendance event.

30. The process of claim 29, including the steps of:
   determining if there is a previous time record; and if not, creating a new time record and inserting the received time attendance event stop time as the stop time.

31. The process of claim 29, including the steps of:
   determining if there is a previous time record;
      if so, determining that the received time attendance event stop time is not between a completed time record; and
      inserting received time attendance event stop time in previous time record.

32. The process of claim 29, including the steps of:
   determining if there is a previous time record;
   if so, determining that the received time attendance event stop time is between a completed time record;
   determining that the completed time record has a known stop event time;
   creating a new time record and inserting received time attendance event time as the time record's stop time;
   updating the new time record start time with an automatically assigned start time based on time attendance event stop time; and
   overwriting stop time in time recorder with the received time attendance stop time.

33. The process of claim 29, including the steps of:
   determining if there is a previous time record;
      if so, determining that the received time attendance event stop time is between a completed time record;
      determining that the completed time record does not have a known stop event time; and
      overwriting stop time in time recorder with the received time attendance stop time.

34. The process of claim 6, including the steps of determining that the start time is an automatically assigned start time and overwriting the assigned start time with the received start time.

35. The process of claim 8, including the steps of determining that the immediately following time is an assigned stop time and updating the immediately following time record start time with the received time attendance event time.

36. The process of claim 1, wherein the processing step includes the steps of:
   receiving a time attendance event and determining that it is a stop event time;
   determining that the previous time record does not have a stop time and is within the maximum time span allowed for the user associated with the time attendance event; and
   closing the previous time record with the received time attendance event stop time.

37. The process of claim 21, including the steps of determining that the start time is an automatically assigned start time and overwriting the assigned start time with the received start time.

38. The process of claim 23, including the steps of determining that the immediately following time is an assigned stop time and updating the immediately following time record start time with the received time attendance event time.

39. The process of claim 19, wherein the processing step includes the steps of:
   receiving a time attendance event and determining that it is a stop event time;
   determining that the previous time record does not have a stop time and is within the maximum time span allowed for the user associated with the time attendance event; and
   closing the previous time record with the received time attendance event stop time.

40. The process of claim 2, wherein the verifying user identifying code step includes the step of comparing the date of the log in to the database of known user identifying codes.

41. The process of claim 19, wherein the verifying user identifying code step includes the step of comparing the date of the log in to the database of known user identifying codes.

* * * * *